US012561477B2

(12) United States Patent　　　　(10) Patent No.:　US 12,561,477 B2
Tadesse et al.　　　　　　　　　　　　(45) Date of Patent:　　Feb. 24, 2026

(54) AUTOMATED SPARSITY FEATURE SELECTION

(71) Applicant: INTERNATIONAL BUSINESS MACHINES CORPORATION, Armonk, NY (US)

(72) Inventors: Girmaw Abebe Tadesse, Nairobi (KE); William Ogallo, Nairobi (KE); George Sirbu, Saline, MI (US); Aisha Walcott, Nairobi (KE); Skyler Speakman, Nairobi (KE)

(73) Assignee: International Business Machines Corporation, Armonk, NY (US)

( * ) Notice: Subject to any disclaimer, the term of this patent is extended or adjusted under 35 U.S.C. 154(b) by 514 days.

(21) Appl. No.: 18/045,673

(22) Filed: Oct. 11, 2022

(65) Prior Publication Data

US 2024/0135034 A1　　Apr. 25, 2024

(51) Int. Cl.
*G06F 21/62*　　　　(2013.01)
(52) U.S. Cl.
CPC ............................... *G06F 21/6254* (2013.01)
(58) Field of Classification Search
CPC ................................................. G06F 21/6254
See application file for complete search history.

(56) References Cited

U.S. PATENT DOCUMENTS

| 8,108,324 B2 | 1/2012 | Krupka |
| 9,258,314 B1 | 2/2016 | Xiao |

| 2014/0207765 A1 | 7/2014 | Haws | |
| 2015/0213323 A1* | 7/2015 | Bala | ........................ G06V 40/20 |
| | | | 382/203 |
| 2015/0341379 A1* | 11/2015 | Lefebvre | ................. H04L 43/04 |
| | | | 726/22 |
| 2016/0328838 A1* | 11/2016 | Kwan | ..................... G06V 20/13 |
| 2017/0126709 A1 | 5/2017 | Baradaran | |
| 2017/0213153 A1 | 7/2017 | Wang | |
| 2017/0230392 A1* | 8/2017 | Dean | ................... H04L 63/1441 |
| 2021/0034977 A1 | 2/2021 | Arik | |
| 2021/0342735 A1 | 11/2021 | Kartoun | |

FOREIGN PATENT DOCUMENTS

| EP | 3477555 A1 | 5/2019 |

OTHER PUBLICATIONS

Ammar Mansoor Kamoona, Amirali Khodadadian Gostar, Alireza Bab-Hadiashar and Reza Hoseinnezhad Sparsity-Based Naive Bayes Approach for Anomaly Detection in Real Surveillance Videos Published in: 2019 International Conference on Control, Automation and Information Sciences (ICCAIS) Publisher: IEEE (Year: 2019).*

Sparsity-Based NaÃ⁻ve Bayes Approach for Anomaly Detection in Real Surveillance Videos (Year: 2019).*

(Continued)

*Primary Examiner* — Nicholas R Taylor
*Assistant Examiner* — Tania M Pena-Santana
(74) *Attorney, Agent, or Firm* — Edward J. Wixted, III

(57)　　　　　　ABSTRACT

One or more computer processors discover an anomalous subset through sparsity-based automatic feature selection.

17 Claims, 8 Drawing Sheets

(56) References Cited

OTHER PUBLICATIONS

Awotunde et al., "Intrusion Detection in Industrial Internet of Things Network-Based on Deep Learning Model with Rule-Based Feature Selection", Wireless Communications and Mobile Computing, vol. 2021, Article ID 7154587, Published Sep. 3, 2021, 17 pages.

Hudson et al., "Local Exceptionality Detection in Time Series Using Subgroup Discovery: An Approach Exemplified on Team Interaction Data", Discovery Science, 24th International Conference, DS 2021, Oct. 2021, 12 pages.

Karbir et al., "A Network Intrusion Detection Framework based on Bayesian Network using Wrapper Approach", International Journal of Computer Applications, vol. 166—No. 4, May 2017, 6 pages.

Kim et al., "Semi-orthogonal Embedding for Efficient Unsupervised Anomaly Segmentation", arXiv:2105.14737v1 [cs.CV], May 31, 2021, 17 pages.

Nardone et al., "A Sparse-Modeling Based Approach for Class Specific Feature Selection", PEERJ Computer Science, Published online Nov. 18, 2019, 26 pages.

Sadeghpour et al., "Unsupervised ML Based Detection of Malicious Web Sessions with Automated Feature Selection: Design and Real-World Validation", 2021 IEEE 18th Annual Consumer Communications & Networking Conference (CCNC), 9 pages.

Tadesse et al., "Model-free feature selection to facilitate automatic discovery of divergent subgroups in tabular data", arXiv:2203.04386v1 [cs.LG], Mar. 8, 2022, 14 pages. [Grace Period Disclosure].

Tadesse et al., "Semi-supervised Feature Selection for Efficient Detection of Systemic Deviations to Develop Trustworthy AI", IBM Research, AAAI 2022 Workshop Paper, Abstract Only, 4 pages.

Tadesse et al., "Sparsity-based Feature Selection for Anomalous Subgroup Discovery", arXiv:2201.02008v1 [cs.LG], Jan. 6, 2022, 8 pages.

Tun et al., "Network Anomaly Detection using Threshold-based Sparse Autoencoder", IAIT2020, Jul. 1-3, 2020, Bangkok, Thailand, 8 pages.

* cited by examiner

100

|  | Y = 1 | Y = 0 |
|---|---|---|
| $D_m^\mu$ | $\alpha$ | $\beta$ |
| $\widetilde{D}_m^\mu$ | $\delta$ | $\gamma$ |

```
1  η ←ZerosArray (M);
2  for  fm in F do
3        fm ← IdentifyUniqueValues (fm);
4        Cm ← | fm | ;
5        om ← ZerosArray (Cm);
6        for μ ← to Cm do
7              Dmμ ← Stratification (D, f̂mμ );
8              D̃mμ ← D - Dmμ ;
9              omμ ← YuleY ( Dmμ, D̃mμ );
10       ηm ← GiniSparsity (omμ):
11 I ← SortDescendingIndices (η);
12 Fs ← F[I];
13 Fr ← TopK (Fs, K);
14 return Fr
```

| METHOD | DATASETS | |
| | CLAIM | MIMIC-111 |
| --- | --- | --- |
| Wrapper[21, 23] | 16444.3 | 777.4 |
| Committee[23] | 13565.6 | 652.7 |
| XGBoost[30] | 12306.1 | 124.7 |
| CatBoost[31] | 1259.5 | 21.4 |
| Filter[23] | 494.4 | 14.4 |
| Fast-Shap[25] | 114.1 | 11.3 |
| PROPOSED | 70.5 | 3.3 |

FIG. 5

RANK BASED OVERLAP

600

RANK BASED OVERLAP

| K | #FEATS (#VALS) | SUBSET SIZE | % | JACC. SIM. | ODDS RATIO | CI | P |
|---|---|---|---|---|---|---|---|
| 10 | 1 (1) | 45707 | 25 | 0.81 | 8.25 | (8.32, 8.72) | 0.0 |
| 20 | 3(6) | 44181 | 24 | 0.95 | 8.79 | (8.58, 9.01) | 0.0 |
| 30 | 3(6) | 44181 | 24 | 0.95 | 8.79 | (8.58, 9.01) | 0.0 |
| 40 | 3(6) | 44181 | 24 | 0.95 | 8.79 | (8.58, 9.01) | 0.0 |
| 50 | 3(6) | 44181 | 24 | 0.95 | 8.79 | (8.58, 9.01) | 0.0 |
| 60 | 3(6) | 44181 | 24 | 0.95 | 8.79 | (8.58, 9.01) | 0.0 |
| 70 | 4(9) | 43708 | 24 | 0.95 | 8.91 | (8.7, 9.13) | 0.0 |
| 80 | 5(13) | 42333 | 23 | 0.99 | 9.25 | (9.02, 9.48) | 0.0 |
| 90 | 5(13) | 42333 | 23 | 0.99 | 9.25 | (9.02, 9.48) | 0.0 |
| 100 | 5(13) | 42333 | 23 | 0.99 | 9.25 | (9.02, 9.48) | 0.0 |
| 109 | 6(14) | 42101 | 23 | 1.00 | 9.30 | (9.07, 9.53) | 0.0 |

| K | #FEATS (#VALS) | SUBSET SIZE | % | JACC. SIM. | ODDS RATIO | CI | P |
|---|---|---|---|---|---|---|---|
| 5 | 3(8) | 4577 | 23 | 0.32 | 3.60 | (3.33, 3.89) | 0.0 |
| 10 | 4(9) | 4386 | 22 | 0.34 | 3.65 | (3.38, 3.95) | 0.0 |
| 15 | 4(9) | 4386 | 22 | 0.34 | 3.65 | (3.38, 3.95) | 0.0 |
| 20 | 7(14) | 3183 | 16 | 0.93 | 3.86 | (3.54, 4.2) | 0.0 |
| 25 | 7(11) | 3078 | 16 | 1.00 | 3.95 | (3.63, 4.31) | 0.0 |
| 30 | 7(11) | 3078 | 16 | 1.00 | 3.95 | (3.63, 4.31) | 0.0 |
| 35 | 7(11) | 3078 | 16 | 1.00 | 3.95 | (3.63, 4.31) | 0.0 |
| 40 | 7(11) | 3078 | 16 | 1.00 | 3.95 | (3.63, 4.31) | 0.0 |
| 41 | 7(11) | 3078 | 16 | 1.00 | 3.95 | (3.63, 4.31) | 0.0 |

AUTOMATED SPARSITY FEATURE SELECTION

The following disclosure is submitted under 35 U.S.C. 102(b)(1)(A):

(i) Model-free feature selection to facilitate automatic discovery of divergent subgroups in tabular data; Girmaw Tadesse, William Ogallo, Celia Cintas, and Skyler Speakman; Mar. 8, 2022; https://arxiv.org/pdf/2203.04386.pdf.

BACKGROUND

The present invention relates generally to the field of machine learning, and more particularly to feature selection.

Machine learning (ML) is the scientific study of algorithms and statistical models that computer systems use to perform a specific task without using explicit instructions, relying on patterns and inference instead. Machine learning is seen as a subset of artificial intelligence. Machine learning algorithms build a mathematical model based on sample data, known as training data, in order to make predictions or decisions without being explicitly programmed to perform the task. Machine learning algorithms are used in a wide variety of applications, such as email filtering and computer vision, where it is difficult or infeasible to develop a conventional algorithm for effectively performing the task.

SUMMARY

Embodiments of the present invention disclose a computer-implemented method, a computer program product, and a system. The computer-implemented method includes one or more computer processers discovering an anomalous subset through sparsity-based automatic feature selection.

BRIEF DESCRIPTION OF THE DRAWINGS

FIG. 3 is a contingency table, in accordance with an embodiment of the present invention;

FIG. 4 is an algorithm for SAFS, in accordance with an embodiment of the present invention;

FIG. 5 is a table comparing feature selection methods, in accordance with an embodiment of the present invention;

DETAILED DESCRIPTION

Figure 1:
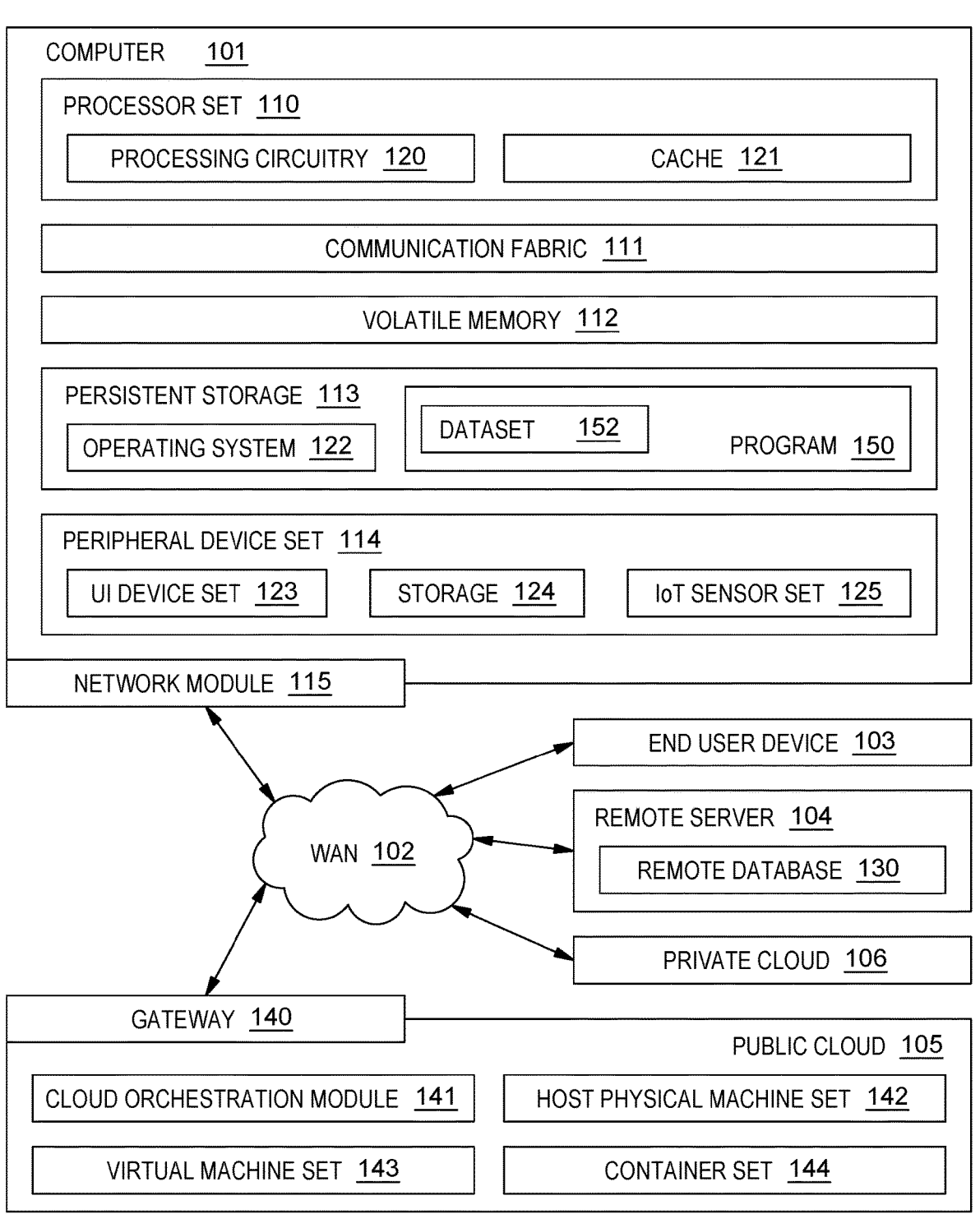
FIG. 1 is a functional block diagram illustrating a computing environment, in accordance with an embodiment of the present invention.

AI research has been focused on building sophisticated models that aim to exploit large baseline datasets across different domains. Existing technologies, such as automated machine learning, make building and training AI models easy while achieving competitive performance with the state-of-the-art models. However, progress in research and practices to extract data-centric perspectives have been relatively limited, and hence significant resource is still allocated to clean and analyze data prior to feeding it to a model. Recent studies also show that baseline datasets contain considerable erroneous annotations. Data-centric AI is a growing field of research that aims to clean, evaluate data, and extract insights that are crucial for AI researchers/practitioners, domain-experts, and policy makers.

Stratification of data is a common technique to understand deviations across different values of a feature of interest. However, manual stratification does not scale up to encode interactions among higher number of features. Furthermore, human-level exploration is limited as humans prioritize some hypotheses while ignoring others, early stopping of the exploration upon finding the first "significant" pattern in the data, and a tendency to identify patterns in the data that are not actually there (i.e., Type-1 error). To this end, automatic discovery techniques: 1) scale stratification to a higher number of features, 2) are less reliant on humans to pose the questions as this transfers biases, 3) prioritize detecting patterns with the most evidence, and 4) guard against false discoveries are necessary.

Existing divergent (also known as outlier or anomalous) subgroup detection techniques are mainly categorized into reconstruction, classification, and probabilistic groups. The well-known principal component analysis and autoencoders are examples of reconstruction-based methods that, first, transform the data (e.g., to a latent space) so that anomalousness could be detected from failing to reconstruct the data back from the transformed data. Classification-based approaches, particularly one-class classification, are often employed due to the lack of examples representing anomalous cases. Furthermore, the traditional probabilistic models have also been used to identify anomalous samples using estimation of the normal data probability distribution, e.g., Gaussian mixture models and Mahalanobis distance evaluation. Moreover, there are purely distance-based methods, such as k-nearest neighborhood, which do not require a prior training phase nor data transformations. Of note is that most existing methods infer anomalousness by exploiting individual sample characteristics rather than group-based characteristics. To this end, researchers proposed techniques that aim to identify subsets of anomalous samples by exploiting group-level characteristics. Application of divergent group detection is crucial across different domains that include healthcare, cybersecurity, insurance and finance sectors, and industrial monitoring. For example, in healthcare, deviations could be erratic data annotations, vulnerable groups, least risk group, and heterogeneous treatment effects.

However, most existing detection techniques use the whole input feature set as a search space, which includes exponentially growing combinations of feature values. For example, if there are M binary features, there are $2^M-1$ possible combinations of feature values that may characterize a subgroup. In addition to the extended requirement of computational resources for large M, the identified subgroup might also be less interpretable when too many features are used to describe it. To this end, feature selection techniques could be employed to select $K \leq M$ features to reduce the computational cost associated with detecting the subgroup due to the reduced search space while maintaining the detection performance.

Embodiments of the present invention provide a method for detecting anomalous subgroups with large number of features where there is little or no prior information available on selecting one or more covariates that are more significant for detecting divergence in the subgroups of the population. Embodiments of the present invention propose a model-free and sparsity-based automatic feature selection (SAFS) framework to facilitate automatic discovery of divergent subgroups. Different from filter-based selection techniques, the present invention exploits sparsity of objective measures among feature values to rank and select features. The present invention (i.e., SAFS) validates across publicly available datasets as compared with existing feature selection methods. SAFS achieves a reduction of feature selection time by a factor of 81× and 104×, averaged across the existing methods. SAFS-selected features are also shown to achieve competitive detection performance, e.g., 18.3% of features selected by SAFS detected divergent samples similar to those detected by using the whole features with a Jaccard similarity of 0.95 but with a 16× reduction in detection time.

Embodiments of the present invention exploit the sparsity of objective measures by first quantifying the association between each feature value and the outcome. Embodiments of the present invention apply a sparsity evaluation to encode the deviations of the objective measures across unique values of a feature, and ranks features as per respective sparsity values. Embodiments of the present invention feed the top k features in the SAFS rankings into an existing multi-dimensional subset scanning framework that automatically stratifies and detects a divergent subgroup with the extreme deviation from the expected. This group discovery process is followed by embodiments of the present invention characterizing feature descriptions, size, and divergent metrics between the identified subgroup and the remaining input data. Embodiments of the present invention reduce the search space and consequently, an amount of time and memory required to complete subnet/subgroup/subpopulation discovery; decrease a number of optimization steps necessary to approximate global optima; and improve an interpretation of an identified anomalous subgroup while removing or discarding less relevant or noisy features. Implementation of embodiments of the invention may take a variety of forms, and exemplary implementation details are discussed subsequently with reference to the Figures.

The present invention will now be described in detail with reference to the Figures.

FIG. 1 depicts computing environment 100 illustrating components of computer 101 in accordance with an illustrative embodiment of the present invention. It should be appreciated that FIG. 1 provides only an illustration of one implementation and does not imply any limitations with regard to the environments in which different embodiments may be implemented. Many modifications to the depicted environment may be made.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, defragmentation, or garbage collection, but this does not render the storage device as transitory because the data is not transitory while it is stored.

Computing environment 100 contains an example of an environment for the execution of at least some of the computer code involved in performing the inventive methods, such as program 150. In addition to program 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and program 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network, or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 4. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip". In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in program 150 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface type operating systems that employ a kernel. The code included in program 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images". A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community, or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Program 150 is a program for sparsity-based automated feature selection. In various embodiments, program 150 may implement the following steps to discover an anomalous subset through sparsity-based automatic feature selection: stratifying a dataset into two or more stratified subsets; evaluating a likelihood of an outcome of a respective interest in each of the stratified subsets as compared to the dataset; encoding the outcome likelihood deviation for each feature in each stratified subset; selecting a set of top features based respective encoded outcome likelihood deviation; and identifying the anomalous subset utilizing multi-dimensional subset scanning as a search problem. Program 150, specifically the automated feature selection process, is defined as a function $\mathcal{R}(\bullet)$ that takes D as input and provides $D^r$ represented by the top K features i.e., $D^r=(D, K)=\{(x_i^r, y_i)|i=1, 2, \ldots, N\}$ and $x_i^r$ is represented by $F^r=\{f_1^r, f_2^r, \ldots, f_k^r, \ldots, f_K^r\}$, where K≤M. Then an existing subgroup discovery method $S(\bullet)$, takes $D^r$ as input and identifies the anomalous subgroup $(D^a)$ represented by the sets of anomalous features $F^a=\{f_z^a\}_{z=1}^Z$, Z≤K≤M. The overall anomalous feature subspace is described as the logical (AND/OR) combinations of anomalous feature values as $\hat{F}^a=\cap_{z=1}^Z(\cup_{h=1}^{H_z}\hat{f}_{zh}^a)$, where $\hat{f}_{zh}^a$ represents the $h^{th}$ value of the $f_z^a$ and $H_z<C_z$. Note that $F^a\subseteq F^r\subseteq F$. The detected divergent subgroup $\hat{D}^a$ contains samples from $D^r$ whose feature values are characterized by $\hat{F}^a$, i.e., $D^a=\{(x_j^a, y_j^a)|j=1, 2, \ldots, P\}$, where P<N. The divergence of the identified subgroup is evaluated using the anomalous score, $\Gamma(D^a, D^r)$ followed by post-discovery metrics such as odds ratio to quantify its divergence from the remaining subset of the input data. In the depicted embodiment, program 150 is a standalone software program. In another embodiment, the functionality of program 150, or any combination programs thereof, may be integrated into a single software program. In some embodiments, program 150 may be located on separate computing devices (not depicted) but can still communicate over WAN 102. In various embodiments, client versions of program 150 resides on any other computing device (not depicted) within computing environment 100. In the depicted embodiment, program 150 includes dataset 152. Program 150 is depicted and described in further detail with respect to FIG. 2.

Dataset 152 is a dataset (i.e., $D=\{(x_i, y_i)|i=1, 2, \ldots, N\}$) containing N samples where each sample $x_i$ is characterized by a set of M discretized features (e.g., covariates) $F=[f_1,$ $f_2, \ldots, f_m, \ldots, f_M$] and $y_i$ represents the binary outcome label. In an embodiment, each feature $f_m$ has $C_m$ unique values, $\hat{f}_m = \{\hat{f}_m{}^u\}_{u=1}{}^{C_m}$.

The present invention may contain various accessible data sources, such as dataset 152, that may include personal storage devices, data, content, or information the user wishes not to be processed. Processing refers to any, automated or unautomated, operation or set of operations such as collection, recording, organization, structuring, storage, adaptation, alteration, retrieval, consultation, use, disclosure by transmission, dissemination, or otherwise making available, combination, restriction, erasure, or destruction performed on personal data. Program 150 provides informed consent, with notice of the collection of personal data, allowing the user to opt in or opt out of processing personal data. Consent can take several forms. Opt-in consent can impose on the user to take an affirmative action before the personal data is processed. Alternatively, opt-out consent can impose on the user to take an affirmative action to prevent the processing of personal data before the data is processed. Program 150 enables the authorized and secure processing of user information, such as tracking information, as well as personal data, such as personally identifying information or sensitive personal information. Program 150 provides information regarding the personal data and the nature (e.g., type, scope, purpose, duration, etc.) of the processing. Program 150 provides the user with copies of stored personal data. Program 150 allows the correction or completion of incorrect or incomplete personal data. Program 150 allows the immediate deletion of personal data.

Figure 2:
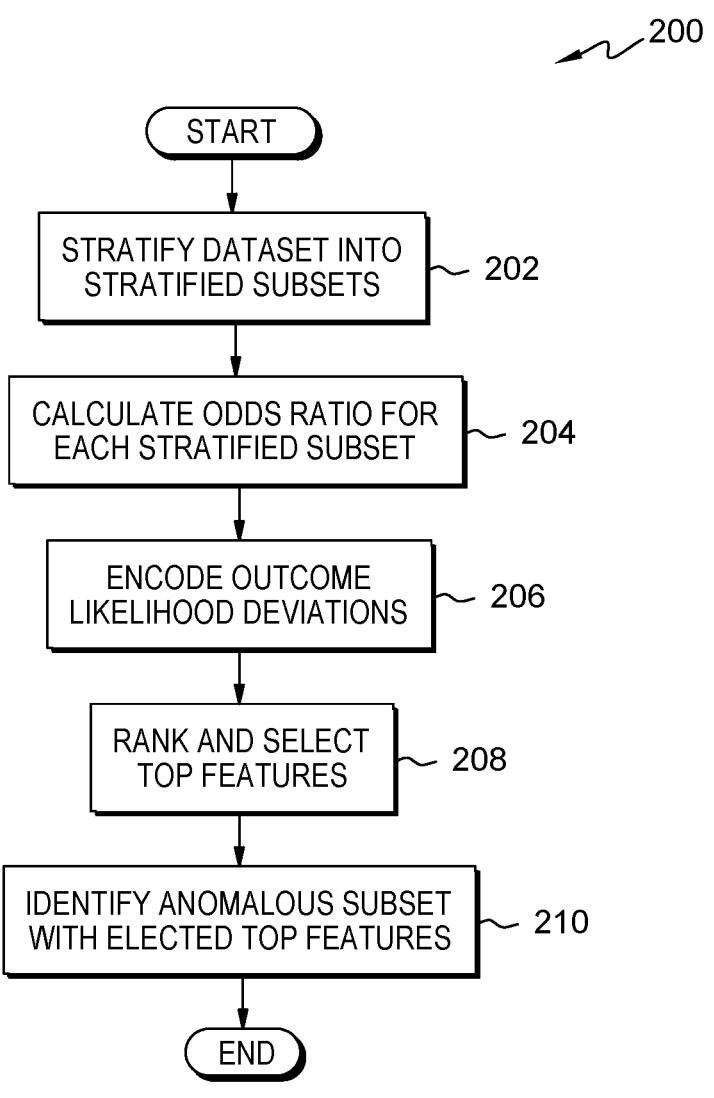
FIG. 2 is a flowchart depicting operational steps of a program, on a computer within the computing environment of FIG. 1, for sparsity-based automated feature selection (SAFS), in accordance with an embodiment of the present invention.

FIG. 2 depicts flowchart 200 illustrating operational steps of program 150 for sparsity-based automated feature selection, in accordance with an embodiment of the present invention.

Program 150 (step 202) stratifies a dataset. Responsive to an inputted dataset 152, program 150 initiates and pre-processes dataset 152. In an embodiment, program 150 transforms features within dataset 152 through discretization, normalization, and noise mitigation. Responsively, program 150 applies stratification by feature value is done to obtain a stratified subset of the given data satisfying each unique feature value of a particular feature. In an embodiment, program 150 stratifies dataset 152 (D) per each feature $\hat{f}_m{}^u \in \hat{f}_m$, resulting in two subsets $D_m{}^u$ and $\widetilde{D_m^u}$, where $D = D_m{}^u \cup \widetilde{D_m^u}$ and $D_m{}^u = D|(\hat{f}_m = \hat{f}_m{}^u)$. For example, a feature Sex may have three unique values, Male, Female, and Unknown/Missing. In this example, program 150 utilizes a feature under-consideration of $f_m = $Sex with three unique values in D: $\hat{f}_m{}^1 = $Female, $\hat{f}_m{}^2 = $Male, $\hat{f}_m{}^3 = $Unknown/Missing. In this example, program 150 stratifies for $\hat{f}_m{}^1$, giving $D_m{}^1$ containing all samples in D with Sex=Female, and $\widetilde{D_m^1}$ containing all samples in with Sex=Male or Unknown/Missing, thus generating two stratified subsets characterized by each unique value of the Sex feature.

Program 150 calculates an odds ratio computation for each stratified subset (step 204). Program 150 evaluates a likelihood of an outcome of a respective interest in each stratified subset as compared to dataset 152, as a whole. In an embodiment, program 150 generates a vector of odds ratios with a length equal to a number of unique values per feature. In another embodiment, program 150 computes a Yule's coefficient by generating a 2×2 contingency table from $D_m{}^u$ and $\widetilde{D_m^u}$ as depicted in FIG. 3, where program 150 utilizes the computed Yule's Y as an objective measure for feature value.

Program 150 encodes outcome likelihood deviation for each feature (step 206). In an embodiment, program 150 applies a sparsity evaluation to encode one or more deviations for each feature in a stratified subset with respective outcome likelihoods associated with a respective feature across associated values, wherein the evaluation reflects potential systemic deviation. In this embodiment, program 150 utilizes a Hoyer sparsity metric. Responsive to the present invention computing the Yule's Y for each feature $f_m$, program 150 employs a Gini-index to evaluate the sparsity of Yule's Y coefficient across the feature values. In an embodiment, program 150 selects Gini-index as a sparsity measure that satisfies the required sparsity constraints. In another embodiment, program 150 utilizes a sparsity metric derived from a measure of effect such as, but not limited to, relative risk, risk difference, and rate difference. In yet another embodiment, the sparsity metric is derived from an expectation-based scan statistic. In another embodiment, program 150 utilizes multiple sparsity metrics by aggregated ranking to maximize ranking efficiency.

Program 150 ranks and selects top features (step 208). In an embodiment, program 150 ranks each feature in descending order based on respective sparsity metrics as encoded in step 206. In this embodiment, program 150 ranks by feature where the top feature represents a features with a largest variation or deviation of a respective outcome likelihood among associated unique values. In another embodiment, program 150 computes the Gini-index over the ranked vector of objective measures $\vec{o}_m = o_m{}^{(1)}, o_m{}^{(2)}, \ldots, o_m{}^{(c_m)}$ in ascending order, i.e., $o_m{}^{(1)} \leq o_m{}^{(2)} \leq \ldots \leq o_m{}^{(c_m)}$ and (1), (2), ... ($C_m$) are the indices after the sorting operation. The present invention computes the Gini-index for all features $m = [1, 2, \ldots, M]$ and ranks in decreasing order where a feature with the largest Gini-index takes the top rank or spot. The summary of the steps for sparsity-based feature selection is depicted in FIG. 4. Responsively, program 150 selects a top K ranked features, where K is predefined, predetermined, or optimally computed to satisfy a balance of computational cost and detection performance requirements. Here, program 150 modifies K achieve optimal number of selected features without loss of detection performance (i.e., increase in detection duration or increase in computation resources).

Program 150 identify an anomalous subset with selected top features (step 210). In an embodiment program 150 identifies an anomalous subset with divergent characteristics using existing subset or subgroup discovery techniques. In an embodiment, the program 150 discovers one or more subgroups via subnet scanning. In another embodiment, program 150 employs Multi-Dimensional Subset Scanning (MDSS: anomalous pattern detection) to identify significantly divergent subsets. In an embodiment, program 150 utilizes MDSS as a search problem over possible subsets in a multi-dimensional array to identify the subsets with a systematic deviation between observed outcomes (i.e., $y_i$) and expectation of the outcomes, the latter of which are set differently for variants of the algorithm. In the simple automatic stratification setting, the expectation is the global outcome average $$\mu_g = \frac{\sum_{i=1}^N y_i}{N}$$

in $D^r$. In an embodiment, program 150 calculates a deviation between the expectation and observation is evaluated by maximizing a Bernoulli likelihood ratio scoring statistic for a binary outcome, $\Gamma(\bullet)$. The null hypothesis assumes that the likelihood of the observed outcome in each subgroup $D^s$ is similar to the expected, i.e., $H_0$:

$$\text{odds}\,(D^s) = \frac{\mu_g}{1 - \mu_g};$$

while the alternative hypothesis assumes a constant multiplicative increase in the odds of the observed outcome in the anomalous or extremely divergent subgroup, i.e., $H_1$:

$$\text{odds}\,(D^a) = \frac{\mu_g}{1 - \mu_g}$$

where $q \neq 1$. In an embodiment, $q > 1$ for extremely over-observed subgroup (e.g., high risk population) and $q < 1$ for extremely under-observed subgroup (e.g., low risk population). The anomalous scoring function for a subgroup $(D^s)$ with reference $D^r$ is formulated as $\Gamma(D^s, D^r)$ and computed as:

$$\Gamma(D^s, D^r) = \frac{\max}{q} \log(q) \sum\nolimits_{i \in S} y_i - N_S * \log(1 - \mu_g + q\mu_g), \qquad 1)$$

with respect to equation (1), where $N_s$ is the number of samples in $D^s$. In an embodiment, program 150 iterates divergent subgroup identification until convergence to a local maximum is found, and the global maximum is subsequently optimized using multiple random restarts.

Responsive to an identified anomalous subset, program 150 validates a reduction in computation time using just K features (i.e., features associated with the identified subset) while detection performance is maintained. In an embodiment, program 150 characterizes the identified anomalous subgroup $(D^a)$ by quantifying the anomalousness score $\Gamma(D^s, D^r)$, the analysis of the anomalous features and respective values $\overline{F^a}$, the size of the subgroup $N_S$, the odds ratio between $D^a$ and $\overline{D^a}$ and 95% Confidence Interval (CI) of the odds ratio, the significance tests quantified using empirical p-value, and the time elapsed to identify $D^a$. Here, program 150 computes respective characterization metrics as scores to describe the level of divergence (anomalousness) (e.g., odds ratios) between an identified divergent subset and dataset 152.

In an embodiment, program 150 identifies one or more anomalous subgroups in a population with respect to gaps in care. In this embodiment, the unit of analysis is an individual and there are potentially large number of features related to individual demographics, social determinants of health, healthcare use, diagnostics history, or health status. In this embodiment, program 150 selects a smaller number of features that transforms the search for anomalous subpopulations more computationally efficient and easier to interpret. In another embodiment, program 150 identifies, in real time, subgroups of providers who perform better or worse than expected with respect to a certain healthcare metric (e.g., adverse events after surgeries). Here, the unit of analysis is a healthcare provider comprising a plurality of features related to healthcare provider characteristics potentially, ranging from size and demographics to patterns of practice. Here, program 150 selects a manageable number of features (e.g., predetermined or optimally computed based on available computational resources) for detecting the subgroups with higher or lower performance in a computationally efficient manner suitable for a real time search without any reduction in in detection performance and accuracy. In another embodiment, responsive to an identified anomalous subset, program 150 initiates an action. For example, responsive to program 150 identifies an anomalous medical subset associated with a provider, program 150 automatically suspends provider operations (e.g., billing, ability to provide medicine or services, etc.) or permissions and flags the case for subsequent review. In an embodiment, program 150 extends the selected top features to deep learning activations of a machine learning model (e.g., neural network) to identify a subset comprising layers and/or nodes to detect new or out-of-distribution samples or detect synthesized, fake, or adversarial samples.

Further Embodiments

Data-centric artificial intelligence (AI) encourages the need of data cleaning, valuating, and understanding in order to achieve trustworthy AI. Existing technologies make it easier to design and train models automatically, but there is a lack of a similar level of capabilities to extract data-centric insights. Manual stratification of tabular data per a given feature of interest (e.g., gender) is limited to scale for higher feature dimensions, which could be addressed using automatic discovery of divergent/anomalous subgroups. Nonetheless, these automatic discovery techniques often search across potentially exponential combinations of features that could be simplified using a preceding feature selection step. Existing feature selection techniques for tabular data often involve fitting a particular model (e.g., XGBoost) in order to select important features. However, such model-based selection is prone to model-bias and spurious correlations in addition to requiring extra resource to design, fine-tune and train a model.

Embodiments of the present invention propose a model-free and sparsity-based automatic feature selection (SAFS) framework to facilitate automatic discovery of divergent subgroups. Different from filter-based selection techniques, the present invention exploits sparsity of objective measures among feature values to rank and select features. The present invention (i.e., SAFS) validates across publicly available datasets, compared with six existing feature selection methods. SAFS achieves a reduction of feature selection time by a factor of 81× and 104×, averaged across the existing methods. SAFS-selected features are also shown to achieve competitive detection performance, e.g., 18.3% of features selected by SAFS detected divergent samples similar to those detected by using the whole features with a Jaccard similarity of 0.95 but with a 16× reduction in detection time.

AI research has been focused on building sophisticated models that aim to exploit large baseline datasets across different domains. Existing technologies, such as automated machine learning, make building and training AI models easy while achieving competitive performance with the state-of-the-art models. However, progress in research and practices to extract data-centric perspectives have been relatively limited, and hence significant resource is still allocated to clean and analyze data prior to feeding it to a model. Recent studies also show that baseline datasets contain considerable erroneous annotations. Data-centric AI is a growing field of research that aims to clean, evaluate data, and extract insights that are crucial for AI researchers/ practitioners, domain-experts, and policy makers.

Stratification of data is a common technique to understand deviations across different values of a feature of interest. However, manual stratification does not scale up to encode interactions among higher number of features. Furthermore, human-level exploration is limited as humans prioritize some hypotheses while ignoring others, early stopping of the exploration upon finding the first "significant" pattern in the data, and a tendency to identify patterns in the data that are not actually there (i.e., Type-1 error). To this end, automatic discovery techniques: 1) scale stratification to a higher number of features, 2) are less reliant on humans to pose the questions as this transfers biases, 3) prioritize detecting patterns with the most evidence, and 4) guard against false discoveries are necessary.

Existing divergent (also known as outlier or anomalous) subgroup detection techniques are mainly categorized into reconstruction, classification, and probabilistic groups. The well-known principal component analysis and autoencoders are examples of reconstruction-based methods that, first, transform the data (e.g., to a latent space) so that anoma- lousness could be detected from failing to reconstruct the data back from the transformed data. Classification-based approaches, particularly one-class classification, are often employed due to the lack of examples representing anoma- lous cases. Furthermore, the traditional probabilistic models have also been used to identify anomalous samples using estimation of the normal data probability distribution, e.g., Gaussian mixture models and Mahalanobis distance evalu- ation. Moreover, there are purely distance-based methods, such as k-nearest neighborhood, which do not require a prior training phase nor data transformations. Of note is that most existing methods infer anomalousness by exploiting indi- vidual sample characteristics rather than group-based char- acteristics. To this end, researchers proposed techniques that aim to identify subsets of anomalous samples by exploiting group-level characteristics. Application of divergent group detection is crucial across different domains that include healthcare, cybersecurity, insurance and finance sectors, and industrial monitoring. For example, in healthcare, deviations could be erratic data annotations, vulnerable groups, least risk group, and heterogeneous treatment effects.

However, most existing detection techniques use the whole input feature set as a search space, which includes exponentially growing combinations of feature values. For example, if there are M binary features, there are $2^M-1$ possible combinations of feature values that may character- ize a subgroup. In addition to the extended requirement of computational resources for large M, the identified subgroup might also be less interpretable when too many features are used to describe it. To this end, feature selection techniques could be employed to select K≤M features to reduce the computational cost associated with detecting the subgroup due to the reduced search space while maintaining the detection performance.

Existing feature selection techniques are categorized as supervised and unsupervised based on use of ground-truth labels in the data. Examples of supervised feature selection techniques include filters, wrappers, and embedded tech- niques. In contrast, auto-encoders and principal component analysis are examples of unsupervised techniques that reduce the feature dimension in the latent space. Existing filter-based feature selection techniques employ objective measures, such as mutual information, to encode the asso- ciation between each feature and the outcome of interest. Wrapper methods use specific machine learning models to evaluate and select features. Said methods measure the usefulness of features by learning a stepwise linear classifier or regressor using a recursive selection method, such as forward selection or backward elimination, until a stopping criteria is reached. On the other hand, embedded techniques utilize the output of model-fitting upon which feature impor- tance ranking is extracted. Embedded techniques may require hyperparameter fine-tuning of the model or training with a default tree-based classifier.

Generally, existing wrapper and embedded feature selec- tion techniques mainly optimize over aggregated prediction performance of a trained model resulting in extra computa- tional overhead (due to model fitting), and the feature selection output is prone to model hyperparameters, class imbalance, and under-/over-fitting. Even though existing filter-based feature selection techniques do not require model training, said techniques are also limited in exploring the object measure variations across different unique values of a particular feature.

The present invention is a sparsity-based automatic fea- ture selection framework (SAFS) employing normalized odds ratio as an objective measure to evaluate the associa- tion between a feature value and the target outcome. SAFS is model-free as it does not require training a particular model. In addition, SAFS encodes deviations of associations among feature values with the target using Gini-based sparsity evaluation metric. Generally, the contributions of the present invention are as follows: 1) a model-free feature selection technique tailored to encode systemic deviations among subsets in a tabular data using a combination of association (i.e., normalized odds ratio) and sparsity (i.e., Gini index) measures that satisfy corresponding require- ments; 2) validation using publicly available datasets; 3) SAFS performing comparably to multiple existing feature selection techniques that include a mutual information based filter, wrappers, and embedded techniques such as XGBoost, CatBoost, Committee, and Shap. The results show that the present invention (SAFS) outperforms the baselines in rank- ing the features with significantly reduced ranking time.

Embodiments of the present invention employ multi- dimensional subset scanning to validate the detection of the subgroups. Results show that 18.3% and 48.8% features selected by SAFS achieved competitive detection perfor- mance compared with the whole feature sets, with a Jaccard similarity of 0.93 and 0.95, in the identified divergent samples.

The proposed framework is illustrated in FIG. 2, where the sparsity-based automatic feature selection (SAFS) pre- cedes the divergent subgroup detection and characterization steps. SAFS exploits the sparsity of objective measures by first quantifying the association between each feature value and the outcome. Then a sparsity evaluation is applied to encode the deviations of the objective measures across unique values of a feature, and the features are ranked as per respective sparsity values. The top k features in the SAFS rankings are then fed into an existing multi-dimensional subset scanning framework that automatically stratifies and detects a divergent subgroup with the extreme deviation from the expected. This group discovery process is followed by characterizing its feature descriptions, size, and divergent metrics between the identified subgroup and the remaining input data, such as odds ratio. Each component of the framework is described below in detail.

Let $D=\{(x_i, y_i)|i=1, 2, \ldots, N\}$ denote a dataset containing N samples where each sample $x_i$ is characterized by a set of M discretized features $F=[f_1, f_2, \ldots, f_m, \ldots, f_M]$ and $y_i$ represents the binary outcome label. In an embodiment, that each feature $f_m$, has $C_m$ unique values, $\hat{f}_m=\{\hat{f}_m{}^u\}_{u=1}^{C_m}$. The present invention's proposed automated feature selection process is defined as a function $\mathcal{R}(\bullet)$ that takes D as input and provides $D^r$ represented by the top K features i.e., $D^r=(D, K)=\{(x_i{}^r, y_i)|i=1, 2, \ldots, N\}$ and $x_i{}^r$ is represented by $F^r=\{f_1{}^r, f_2{}^r, \ldots, f_k{}^r, \ldots, f_K{}^r\}$, where K≤M. Then an existing subgroup discovery method ( ), S(•), takes $D^r$ as input and identifies the anomalous subgroup ($D^a$) represented by the sets of anomalous features $F^a=\{f_z{}^u\}_{z=1}^Z$, Z≤K≤M. The overall anomalous feature subspace is described as the logical (AND and OR) combinations of anomalous feature values as $\hat{F}^a=\cap_{z=1}^Z(\cup_{h=1}^{H_z}\hat{f}_{zh}{}^a)$, where $\hat{f}_{zh}{}^a$ represents the $h^{th}$ value of the $f_z{}^a$ and $H_z<C_z$. Note that $F^a\subseteq F^r\subseteq F$. The detected divergent subgroup $\hat{D}^a$ contains samples from $D^r$ whose feature values are characterized by $\hat{F}^a$, i.e., $D^a=\{(x_j{}^a, y_j{}^a)|j=1, 2, \ldots, P\}$, where P<N. The divergence of the identified subgroup is evaluated using the anomalous score, $\Gamma(D^a, D^r)$ followed by post-discovery metrics such as odds ratio to quantify its divergence from the remaining subset of the input data.

Given a feature $f_m$ with $C_m$ unique values, the present invention manually stratifies D per each feature $\hat{f}_m{}^u\in\hat{f}_m$, resulting in two subsets $D_m{}^u$ and $\widetilde{D_m^u}$, where $D=D_m{}^u\cup \widetilde{D_m^u}$ and $D_m{}^u=D|(\hat{f}_m=\hat{f}_m{}^u)$. For example, the present invention utilizes a feature under-consideration of $f_m$=Sex with three unique values in D: $\hat{f}_m{}^1$=Female, $\hat{f}_m{}^2$=Male, $\hat{f}_m{}^3$=Unknown/Missing. In this example, the present invention stratifies for $\hat{f}_m{}^1$, giving $D_m{}^1$ containing all samples in D with Sex=Female and $\widetilde{D_m^1}$ containing all samples in D with Sex=Male or Unknown/Missing. In order to compute the Yule's coefficient, the present invention generates a 2×2 contingency table from $D_m{}^u$ and $\widetilde{D_m^u}$ as depicted in FIG. 3. The present invention computes Yule's Y objective measure for the feature value $\hat{f}_m{}^u$ as follows:

$$o_m^u = \frac{\sqrt{P(D_m^u, Y=1)P(\widetilde{D_m^u}, Y=0)} - \sqrt{P(D_m^u, Y=0)P(\widetilde{D_m^u}, Y=1)}}{\sqrt{P(D_m^u, Y=1)P(\widetilde{D_m^u}, Y=0)} + \sqrt{P(D_m^u, Y=0)P(\widetilde{D_m^u}, Y=1)}} \qquad 2)$$

$$o_m^u = \frac{\sqrt{\alpha\gamma} - \sqrt{\beta\delta}}{\sqrt{\alpha\gamma} + \sqrt{\beta\delta}} \qquad 3)$$

with respect to equations (1) and (2), where $\alpha$ is the number of samples in $D_m{}^u$ with the binary outcome Y=1, $\beta$ is the number of samples in $D_m{}^u$ with Y=0. Similarly, $\delta$ is the number of samples in $\widetilde{D_m^u}$ with Y=1, $\gamma$ is the number of samples in $\widetilde{D_m^u}$ with Y=0. In an embodiment, $\alpha+\beta$ is the size of $D_m{}^u$ and $\delta+\gamma$ is the size of $\widetilde{D_m^u}$, i.e., N=$\alpha+\beta+\delta+\gamma$. Responsive to the present invention computing $o_m{}^u$ for u=$\{1, 2, \ldots, C_m\}$ of feature $f_m$, the present invention employs Gini-index to evaluate the sparsity of Yule's Y coefficient across the feature values. The present invention selects Gini-index as the only sparsity measure that satisfies the required sparsity constraints. The present invention computes the Gini-index over the ranked vector of objective measures $\overrightarrow{o_m}=o_m{}^{(1)}, o_m{}^{(2)}, \ldots, o_m{}^{(C_m)}$ in ascending order, i.e., $o_m{}^{(1)}\leq o_m{}^{(2)}\leq \ldots \leq o_m{}^{(C_m)}$ and (1), (2), \ldots (C_m) are the indices after the sorting operation. Responsively, the present invention computes the Gini-index ($\eta_m$) of $f_m$ is then computed as:

$$\eta_m = 1 - 2\sum_{i=1}^{C_m} \frac{o_m^{(i)}}{\|\overrightarrow{o_m}\|_1}\left(\frac{C_m - i + \frac{1}{2}}{C_m}\right) \qquad 4)$$

with respect to equation (4), where $\|\bullet\|_1$ represents the $l_1$ norm. The present invention computes the Gini-index for all features m=[1, 2, \ldots, M] and ranked in decreasing order where a feature with the largest Gini-index takes the top rank or spot. The summary of the steps for sparsity-based feature selection is depicted in FIG. 4. The follow up divergent subgroup detection step takes the top K<M features as described below.

In an embodiment, the present invention discovers one or more subgroups via subnet scanning. The present invention employs Multi-Dimensional Subset Scanning (MDSS: anomalous pattern detection) to identify significantly divergent subset of samples. The present invention poses MDSS as a search problem over possible subsets in a multi-dimensional array to identify the subsets with a systematic deviation between observed outcomes (i.e., $y_i$) and expectation of the outcomes, the latter of which are set differently for variants of the algorithm. In the simple automatic stratification setting, the expectation is the global outcome average $$\mu_g = \frac{\sum_{i=1}^N y_i}{N}$$

in $D^r$. The present invention calculates a deviation between the expectation and observation is evaluated by maximizing a Bernoulli likelihood ratio scoring statistic for a binary outcome, $\Gamma(\bullet)$. The null hypothesis assumes that the likelihood of the observed outcome in each subgroup $D^s$ is similar to the expected, i.e., $H_0$:

$$\text{odds}(D^s) = \frac{\mu_g}{1 - \mu_g};$$

while the alternative hypothesis assumes a constant multiplicative increase in the odds of the observed outcome in the anomalous or extremely divergent subgroup, i.e., $H_1$:

$$\text{odds}(D^a) = \frac{\mu_g}{1 - \mu_g}$$

where q≠1. In an embodiment, q>1 for extremely over-observed subgroup (e.g., high risk population) and q<1 for extremely under-observed subgroup (e.g., low risk population). The anomalous scoring function for a subgroup ($D^s$) with reference $D^r$ is formulated as $\Gamma(D^s, D^r)$ and computed as:

$$\Gamma(D^s, D^r) = \max_q \log(q)\sum_{i\in S} y_i - N_S * \log(1 - \mu_g + q\mu_g), \qquad 5)$$

with respect to equation (5), where $N_s$ is the number of samples in $D^s$. Divergent subgroup identification is iterated until convergence to a local maximum is found, and the global maximum is subsequently optimized using multiple random restarts. The characterization of the identified anomalous subgroup ($D^a$) includes quantifying the anomalousness score $\Gamma(D^s, D^r)$, the analysis of the anomalous features and respective values $\widehat{F^a}$, the size of the subgroup $N_s$, the odds ratio between $D^a$ and $\widetilde{D^a}$ and 95% Confidence Interval (CI) of the odds ratio, the significance tests quantified using empirical p-value, and the time elapsed to identify $D^a$.

The present invention employs two publicly available tabular datasets to validate the proposed feature selection framework and identify divergent subgroups in these datasets. These datasets are the Medical Information Mart for Intensive Care (MIMIC-III) and Claim Severity dataset (Claim). MIMIC-III is a freely accessible critical care dataset recording vital signs, medications, laboratory measurements, observations and notes charted by care providers, fluid balance, procedure codes, diagnostic codes, imaging reports, hospital length of stay, and survival data. The present invention selected a study cohort of adult patients (16 years or older) who were admitted to the ICU for the first time. The length of stay was greater than a day, with no hospital readmissions, no surgical cases, and having at least one day one chart events. The final cohort consisted of 19658 rows of patient data. The present invention constructed M=41 features (15 numerical and 26 categorical) based on observations made on the first 24 hours of ICU admission. The numerical features are later discretized. The present invention defined the target outcome as a binary indicator variable $y_i$ such that $y_i=1$ for patients who died within 28 days of the onset of their ICU admission, and $y_i=0$ otherwise.

The Claim dataset is released by an US-based insurance company as a challenge to predict the severity of the claims. In validation, the present invention utilizes 185000 training claim examples with 109 anonymized categorical features and the numeric loss feature is used as the outcome of interest. The present invention transforms the outcome to a binary variable using the median loss as a threshold, i.e., loss values greater than equal to the median loss are set to $y_i=1$, and loss values less than the median are set to $y_i=0$.

In order to compare the present invention (i.e., sparsity-based feature selection framework), the present invention selects multiple existing methods (i.e., Filter, Wrapper, and Embedded methods) in the state-of-the-art for selecting features from tabular data.

Filter-based methods exploit the statistical characteristics of input data to select features independent of any modeling algorithms. In an embodiment, the present invention implements a filter method based on mutual information gain. Features are ranked in decreasing order of their mutual information, and top-ranked features are assumed to be more important than low-ranked features.

Wrapper methods measure the usefulness of features by learning a stepwise Ordinary Least Squares regression and dropping less significant features recursively until a stopping rule, such as the required top K features, is reached. In an embodiment, the present invention implements a wrapper method using recursive feature elimination.

Embedded methods select features based on rankings from a model. The present invention employs two tree-based classifiers. Unlike wrapper method, embedded methods begin with the fitting of the tree-based model followed by ranking features based on their importance. In the case of Committee-based selection, the importance score from each of the two tree-based models is normalized using min-max scaling separately. Then the average of these importance scores is computed to rank the features. The three embedded methods above require calibration of the model. In an embodiment, the present invention utilizes Shap, value-based feature importance using XGBoost classifier, but with the default setting without calibration (herein referred to as Fast-Shap).

Embodiments of the present invention set-up the subgroup discovery task as form of automatic data stratification use cases in the two datasets as follows. The subgroup in MIMIC-III dataset refers to a subset of patients with highest death risk compared to the average population in that dataset ($\mu_g=0.172$). On the other hand, the subgroup discovery task in the Claim dataset is formulated as identifying a subset of claims with the highest severity compared to the $\mu_g=0.422$ of claims possess higher or equal to the median loss.

For each dataset, the present invention conducted subgroup discovery using the top K features selected by the different feature selection methods examined. Specifically, the present invention experimented with top $K \in \{5, 10, 15, 20, 25, 30, 35, 40, 41\}$ features for the MIMIC-III dataset, and top $K \in \{10, 20, 30, 40, 50, 60, 70, 80, 90, 100, 109\}$ features for the Claim dataset. Note that K=41 and K=109 represent using the entire original feature set in MIMIC-III and Claim datasets, respectively.

To compare the different feature selection methods, the present invention measured the computation times elapsed to rank the features as the first performance metric. Furthermore, the present invention explores the similarity of the feature ranking across these methods using rank-based overlap. In addition, the output of the subgroup discovery algorithm using top K features were also evaluated to inspect the usefulness of the selected features to detect divergent subgroup. The present invention also compared the amount of time elapsed to identify the subgroup across different top K values to determine the amount of computation time saved by using the selected top K features rather than the whole input feature set. Lastly, the present invention utilizes a Jaccard similarity to evaluate the similarity of the anomalous samples detected by using the selected top K and the whole features.

FIG. 5 presents the time duration in seconds (s) elapsed by each feature selection method to rank features in the two datasets used for validation. The results show that the proposed sparsity-based feature selection framework achieved the ranking with the shortest duration: 70.5 seconds in Claim and just 3.3 seconds in MIMIC-III datasets, resulting an average reduction of feature selection time by a factor of 104× (in Claim) and 81× (in MIMIC-III) compared to the existing methods. As expected, the wrapper method took the longest duration as it involves recursive fitting of a model and back-ward elimination of features. Considerably, the embedded methods also elapsed considerable time, particularly in the larger dataset due to the need for hyperparameter tuning before selection. The committee vote approach also took longer than any of the XGBoost-based and CatBoost-based embedded methods as it tries to normalize and merge respective separate rankings.

Figure 6A:
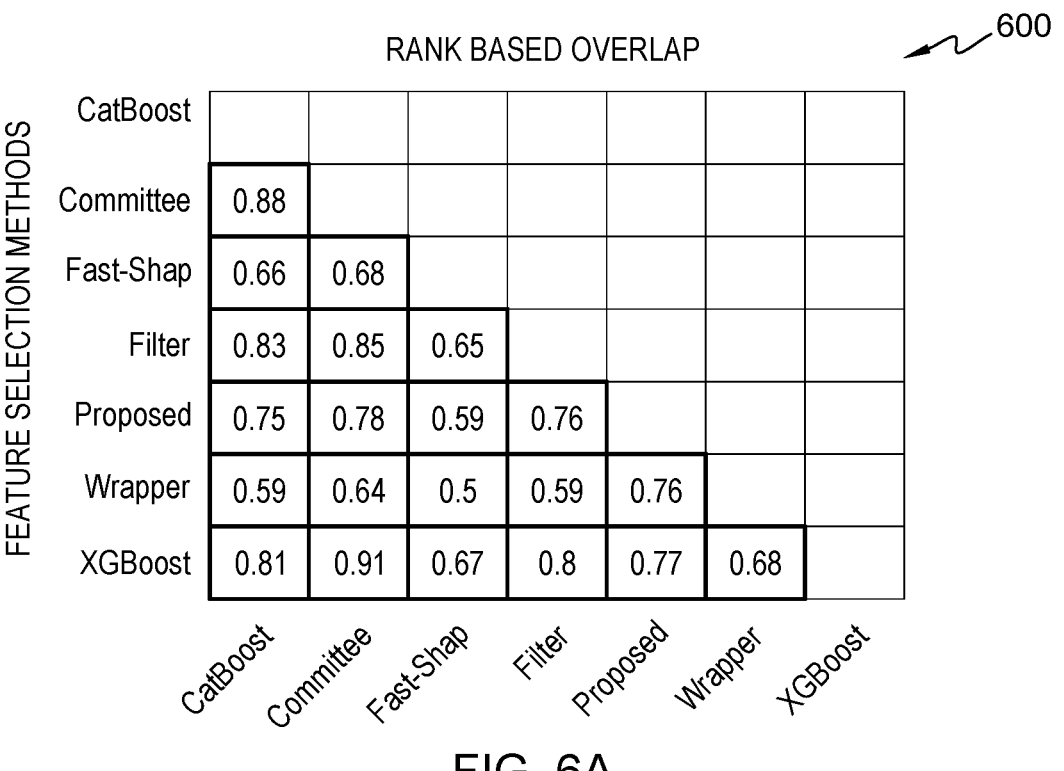
FIGS. 6A and 6B are graphs plotting rank-based overlap scores, in accordance with an embodiment of the present invention.
Figure 6B:
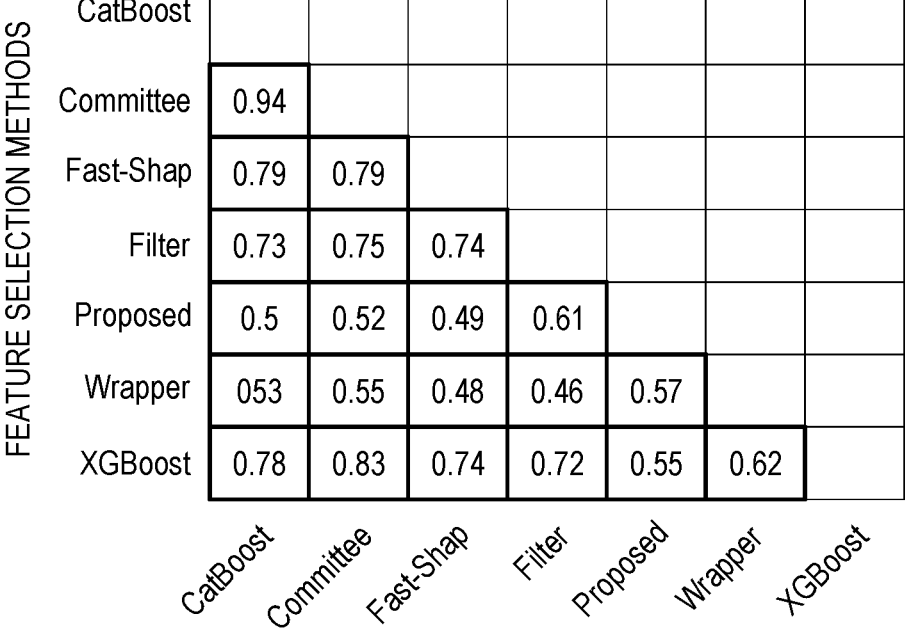

The pairwise similarity of rankings from different feature selection methods are illustrated in FIG. 6A for the MIMIC-III dataset and in FIG. 6B for the Claim datasets using rank-based overlap scores. In both datasets, it is clear that the ranking from Committee vote achieved the higher similarity with CatBoost and XGBoost rankings. This is expected as the Committee vote is generated from the two rankings. The feature rankings from Fast-Shap, relatively, resemble the other embedded techniques, i.e., XGBoost and CatBoost. The overlapping of Fast-Shap and XGBoost are lower than the overlapping of CatBoost and XGBoost even though the only difference between Fast-Shap and XGBoost is that in the latter, the tuning of model parameters was conducted during fitting while Fast-Shap uses the default XGBoost parameters without tuning. The present invention outputs a higher similarity of ranking with that of Filter method as both employ objective measures to quantify the association between features and outcome without training any model. The feature ranking from the Wrapper method is most different from the other methods suggesting that it is the least effective ranking method despite taking the longest duration to rank the features (see FIG. 5).

Figure 7A:
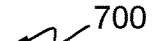
FIGS. 7A and 7B are graphs plotting divergent subgroup discovery times, in accordance with an embodiment of the present invention.
Figure 7A:
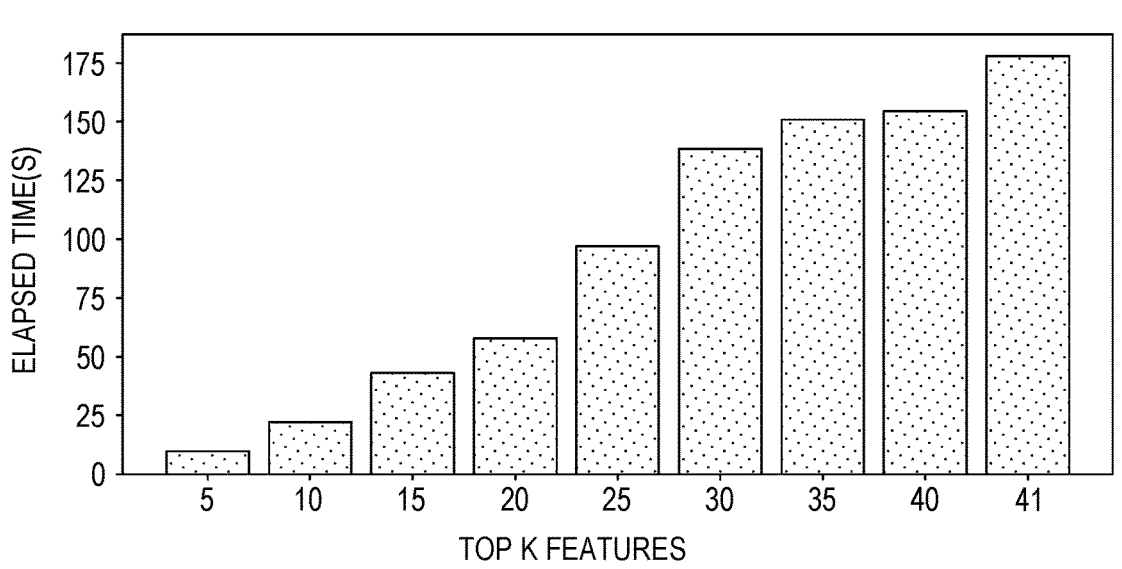
Figure 7B:
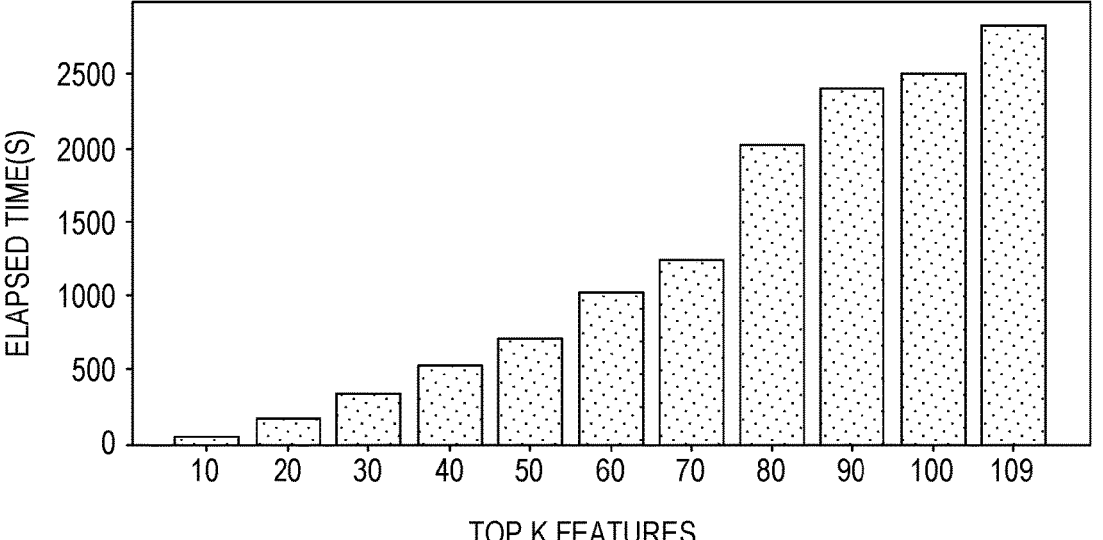
Figures 8A, 8B:
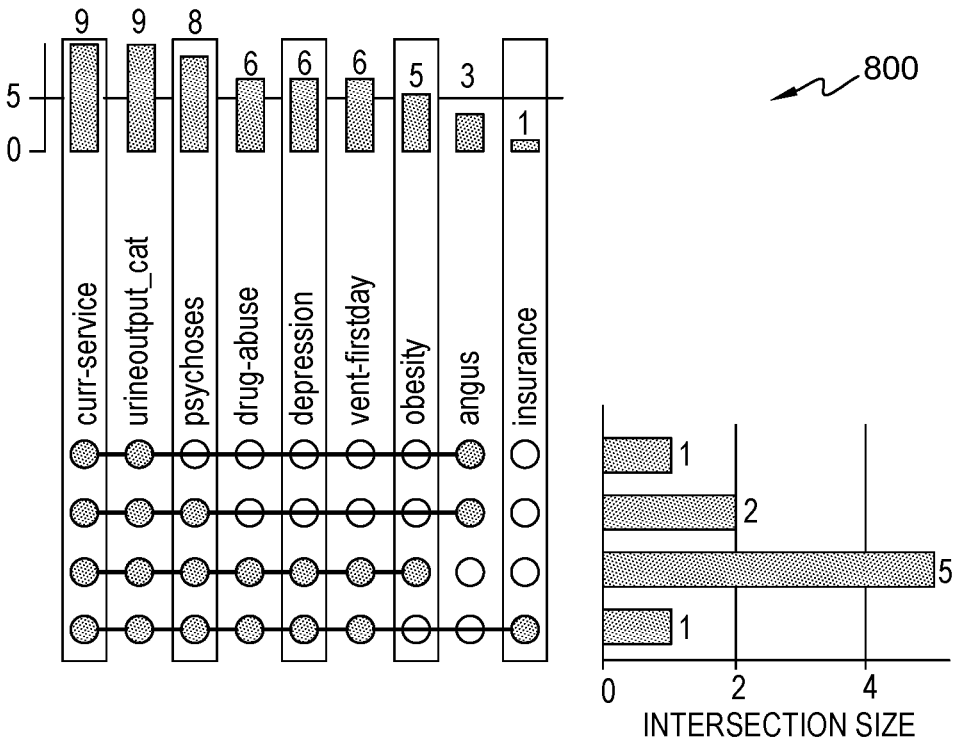
FIGS. 8A and 8B are graphs illustrating upset plots, in accordance with an embodiment of the present invention.

FIGS. 7A and 7B shows a steep increase in the detection time (in seconds) with the increase in the number of features, thereby validating the plausibility of feature selection prior to the subgroup detection step. While it is clear that subgroup discovery is more efficient using a lower number of features selected in a principled way, it is important to evaluate the consistency of features identified to characterize the divergent subgroups detected. Ideally, similar descriptions of anomalous features should be achieved from scanning across different top K features. To this end, the present invention employs Upset plots to visualize the similarity of the features in the anomalous subsets identified by scanning over the top K features using the proposed SAFS method as shown in FIGS. 8A and 8B. In MIMIC-III dataset (see FIG. 8A), two features, curr_service and urineoutput_cat, appear in the anomalous subset across all the different top K values. The feature psychoses are also shown to appear in 8 of 9 different K values. In the Claims dataset (FIG. 8B), three features (cat80, cat1 and cat94) are consistently detected as a subset of the anomalous features at least 10 times out of 11 different K values. This validates the consistency of the identified group across different top K values and reaffirms the benefit of using fewer selected features, which achieve similar subgroup but with significantly reduced computation time.

Figures 9A, 9B:
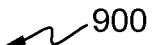
FIGS. 9A and 9B are tables showing anomalous subgroup analysis, in accordance with an embodiment of the present invention.

FIGS. 9A and 9B present a detailed comparison of the identified subgroups across different top K features. The details include the number of features and the corresponding number of values describing the divergent subgroup, the number of samples in the subgroup, and percentage of the whole data in the subgroup. The table also shows the odds ratio (and its 95% CI) of the outcome in the identified subgroup compared to the complement subset, and the significance of the divergence as measured by an empirical p-value. FIG. 9A shows the detected subgroup details for the Claim dataset. It is clear that by just using twenty features (18.3% of the whole features), the present invention identifies a subgroup with 44181 (24% of the whole data) characterized by the following logical combinations of features (and values): cat80 ('B' or 'C') and cat1 ('A') and cat94 ('B', 'C', or 'D'). The odds of experiencing severe claims are 8.79 (95% CI: 8.58; 9.01) higher in the identified subgroup than its complement. This identified subgroup is similar to the subgroup identified using the whole 109 features that results a subgroup of 4201 samples (23% of whole data) and odds ratio of 9.30 (95% CI: 9.07; 9.53). The samples identified by using K=20 and K=109 features have a Jaccard similarity index of 0.95.

FIG. 9B shows the same trend of achieving similar divergent subgroup using fewer number of features in the MIMIC-III dataset. Specifically, using just twenty features (48.8% of whole features), the present invention identifies subgroup size of 3183 (16% of whole data) with a 3.86(95% CI: 3.54; 4.20) increase in odds of experiencing death within 28 days of the onset of their ICU admission. This group is described with the following combination of features (and values): psychoses ('0') and urineoutput_cat ('1' or '2') and drug_abuse ('0') and curr_service ('0' or '5' or '6' or '8') and depression ('0'), insurance ('1' or '2' or '3' or '4') and vent_firstday ('1'). This is similar to the group identified using the whole feature set (K=41), which results in a divergent subgroup of 3078 (16% of whole data) with odds ratio of 3.95 (95% CI: 3.63; 4.31), achieving a Jaccard similarity of 0.93. The results also show that the number of features and their unique values to describe the identified subgroup unnecessarily grows with a larger number of top K features. This validates the benefits of prior feature selection framework before subgroup detection to achieve better interpretability of the identified subgroup and significantly reduce the computation time.

The proposed invention is shown to achieve competitively or better performance than existing feature selection techniques as it does not require fitting of a particular model (compared to existing Wrappers and Embedded methods), and exploits the variation of objective measures across the unique values of a feature (compared to existing Filter methods).

The model-centric approach has grown over the years to solve problems across different domains using sophisticated models trained on large datasets. While methods for data-centric insight extraction have not been given enough attention, said methods possess bigger potential to understand, clean, and valuate data thereby improving the capability for more efficient performance using less resources. Automatic divergent subgroup detection could be employed to answer different data-related questions, e.g., what are the high-risk population towards a particular disease? Such automated techniques often do not require prior assignment of a feature of interest, and are scalable to high-dimensional feature input. However, detection of such subset of the data requires searching across potentially exponential combinations of input features that grow along with the number of input features. To this end, the present invention is a sparsity-based automated feature selection (SAFS) framework for divergent subgroup discovery that significantly reduces the search space and consequently, the amount of time required to complete the discovery and to improve the interpretation of the identified subgroups. SAFS employs a Yule's-Y coefficient as objective measure of effect between each feature value and an outcome; and then encodes the variations across values in a given feature using the Gini-index sparsity metric. Both Yule's-Y and Gini-index are chosen as to satisfy the fundamental requirements of good objective measures and sparsity metrics, respectively. The present invention validates feature selection framework on two publicly available datasets: MIMIC-III (with 41 features) and Claims (with 109 features). The present invention compares SAFS with multiple existing feature selection techniques, such as Filters, Wrappers and Embedded techniques. Results showed that the proposed feature selection framework completed the ranking of features with the shortest duration in the two datasets, resulting an average reduction of feature selection time by a factor of >92× in the datasets (compared to the existing methods). Furthermore, the MDSS-based subgroup detection was employed to automatically identify divergent subgroups, in the two datasets. These subgroups refer to high death risk patients in MIMIC-III and claims with high severity compared to the median loss in Claims dataset. The detection results show the efficiency of the proposed selection method that results in the discovery of similar divergent groups using just ≈33% of the original features (averaged across the datasets) compared to using the whole feature input.

FIG. 3 depicts table 300, in accordance with an illustrative embodiment of the present invention. Table 300 is a 2×2 contingency table from $D_m{}^u$ and $\widetilde{D_m^u}$, where the computed Yule's Y is utilized as an objective measure for feature value and a is the number of samples in $D_m{}^u$ with the binary outcome Y=1, β is the number of samples in $D_m{}^u$ with Y=0. Similarly, δ is the number of samples in $\widetilde{D_m^u}$ with Y=1, γ is the number of samples in $\widetilde{D_m^u}$ with Y=0. In an embodiment, α+β is the size of $D_m{}^u$ and δ+γ is the size of $\widetilde{D_m^u}$, i.e., N=α+β+δ+γ.

FIG. 4 depicts algorithm 400 comprising pseudo-code for SAFS based on the Gini sparsity of Yule's Y coefficients as objective measure between features and a binary outcome.

FIG. 5 depicts table 500 containing comparisons of elapsed times (in seconds) by different feature selection methods for ranking given feature sets across two validation datasets: Claim and MIMIC-III. The present invention achieved the least elapsed time in both the datasets. Table 500 presents the time duration in seconds (s) elapsed by each feature selection method to rank features in the two datasets used for validation. The results show that the proposed sparsity-based feature selection framework achieved the ranking with the shortest duration: 70.5 seconds in Claim and just 3.3 seconds in MIMIC-III datasets, resulting an average reduction of feature selection time by a factor of 104× (in Claim) and 81× (in MIMIC-III) compared to the existing methods.

FIGS. 6A and 6B depict graphs 600 plotting rank-based overlap scores quantifying the pairwise similarity of feature rankings by different selection methods. FIG. 6A presents the MIMIC-III dataset and FIG. 6B presents the Claim datasets using rank-based overlap scores. In both datasets, it is clear that the ranking from Committee vote achieved the higher similarity with CatBoost and XGBoost rankings. This is expected as the Committee vote is generated from the two rankings. The feature rankings from Fast-Shap, relatively, resemble the other embedded techniques, i.e., XGBoost and CatBoost. The overlapping of Fast-Shap and XGBoost are lower than the overlapping of CatBoost and XGBoost even though the only difference between Fast-Shap and XGBoost is that in the latter, the tuning of model parameters was conducted during fitting while Fast-Shap uses the default XGBoost parameters without tuning. The present invention outputs a higher similarity of ranking with that of Filter method as both employ objective measures to quantify the association between features and outcome without training any model. The feature ranking from the Wrapper method is most different from the other methods suggesting that it is the least effective FIGS. 7A and 7B depict graphs 700 plotting time taken to discover the divergent subgroup across different top K features. In an embodiment, K=41 and K=109 represent the whole feature set is used by the detection algorithm. Graphs 700 show a steep increase in the detection time (in seconds) with the increase in the number of features, thereby validating the plausibility of feature selection prior to the subgroup detection step. While it is clear that subgroup discovery is more efficient using a lower number of features selected in a principled way, it is important to evaluate the consistency of features identified to characterize the divergent subgroups detected. Ideally, similar descriptions of anomalous features should be achieved from scanning across different top K features.

FIGS. 8A and 8B depict graphs 800 illustrating upset plots to visualize the similarity of identified anomalous features that describe the detected divergent groups, across the two datasets (MIMIC-III and Claims), using different top K features selected by the proposed SAFS. In MIMIC-III dataset (see FIG. 8A), two features, curr_service and urin-eoutput_cat, appear in the anomalous subset across all the different top K values. The feature psychoses are also shown to appear in 8 of 9 different K values. In the Claims dataset (FIG. 8B), three features (cat80, cat1 and cat94) are consistently detected as a subset of the anomalous features at least 10 times out of 11 different K values. This validates the consistency of the identified group across different top K values and reaffirms the benefit of using fewer selected features, which achieve similar subgroup but with significantly reduced computation time.

FIGS. 9A and 9B depict table 900 presenting a detailed comparison of the identified subgroups across different top K features. Table 900 comprises a post-discovery analysis of identified anomalous subgroups in the two datasets (Claim (FIG. 9A) and MIMIC-III (FIG. 9B)) per each top K features selected for scanning using the MDSS-based automatic stratification. The details include the number of anomalous features detected (#Feats) and number of their unique values (#Vals), number of samples in the identified subgroup (Subset size) and its percentage to the whole data (% of Jaccard similarity between identified samples from using top K and the whole features, the odds ratio of outcome in the identified subset compared to the remaining data, its 95% confidence interval (CI) and the empirical p-value (P). The results show that the discovery of the consistent anomalous subsets across top K values with slight decrease in the subset size as the scanning with higher number of features resulting in more complex anomalous discovery.

What is claimed is:

1. A computer-implemented method comprising:
discovering, by one or more computer processors, an anomalous subset through sparsity-based automatic feature selection, comprising:
  stratifying, by one or more computer processors, a dataset into a plurality of stratified subsets;
  evaluating, by one or more computer processors, a likelihood of an outcome of a respective interest in each of the stratified subsets as compared to the dataset;
  encoding, by one or more computer processors, an outcome likelihood deviation for each feature in each stratified subset;
  selecting, by one or more computer processors, a set of top features based on each respective encoded outcome likelihood deviation;
  identifying, by one or more computer processors, the anomalous subset utilizing multi-dimensional subset scanning as a search problem, comprising:
    optimizing, by one or more computer processors, a global maximum utilizing a plurality of random restarts; and
responsive to the discovering anomalous subset, extending the selected set of top features to one or more activations of a neural network trained to detect a synthesized data sample.

2. The computer-implemented method of claim 1, wherein evaluating the likelihood of the outcome is a vector of odds ratios with a length equal to a number of unique values for a feature.

3. The computer-implemented method of claim 1, wherein the anomalous subset comprises adversarial samples.

4. The computer-implemented method of claim 1, wherein identifying the anomalous subset utilizing multi-dimensional subset scanning as the search problem, comprises:

iterating, by one or more computer processors, divergent subgroup identification until convergence to a local maximum is found.

5. The computer-implemented method of claim 1, further comprising:

characterizing, by one or more computer processors, the identified anomalous subset by quantifying an anomalousness score, an analysis of the anomalous features, a size of the subset, a computed odds ratio, and identification duration.

6. The computer-implemented method of claim 5, where the characterization describes a level of divergence between an identified divergent subset and the dataset.

7. A computer program product comprising:

one or more computer readable storage media having computer-readable program instructions stored on the one or more computer readable storage media, said program instructions execute a computer-implemented method comprising steps of:

discovering an anomalous subset through sparsity-based automatic feature selection, comprising:

stratifying a dataset into a plurality of stratified subsets;

evaluating a likelihood of an outcome of a respective interest in each of the stratified subsets as compared to the dataset;

encoding an outcome likelihood deviation for each feature in each stratified subset;

selecting a set of top features based on each respective encoded outcome likelihood deviation;

identifying the anomalous subset utilizing multi-dimensional subset scanning as a search problem, comprising:

optimizing a global maximum utilizing a plurality of random restarts; and responsive to the discovering anomalous subset, extending the selected set of top features to one or more activations of a neural network trained to detect a synthesized data sample.

8. The computer program product of claim 7, wherein evaluating the likelihood of the outcome is a vector of odds ratios with a length equal to a number of unique values for a feature.

9. The computer program product of claim 7, wherein the anomalous subset comprises adversarial samples.

10. The computer program product of claim 7, wherein the program instruction to identify the anomalous subset utilizing multi-dimensional subset scanning as the search problem, comprise the steps of:

iterating divergent subgroup identification until convergence to a local maximum is found.

11. The computer program product of claim 7, wherein the program instructions, stored on the one or more computer readable storage media, further comprise the steps of:

characterizing the identified anomalous subset by quantifying an anomalousness score, an analysis of the anomalous features, a size of the subset, a computed odds ratio, and identification duration.

12. The computer program product of claim 11, where the characterization describes a level of divergence between an identified divergent subset and the dataset.

13. A computer system comprising:

one or more computer processors;

one or more computer readable storage media having computer readable program instructions stored on the one or more computer readable storage media for execution by at least one of the one or more processors, the stored program instructions execute a computer-implemented method comprising steps of:

discovering an anomalous subset through sparsity-based automatic feature selection, comprising:

stratifying a dataset into a plurality of stratified subsets;

evaluating a likelihood of an outcome of a respective interest in each of the stratified subsets as compared to the dataset;

encoding an outcome likelihood deviation for each feature in each stratified subset;

selecting a set of top features based on each respective encoded outcome likelihood deviation;

identifying the anomalous subset utilizing multi-dimensional subset scanning as a search problem, comprising:

optimizing a global maximum utilizing a plurality of random restarts; and responsive to the discovering anomalous subset, extending the selected set of top features to one or more activations of a neural network trained to detect a synthesized data sample.

14. The computer system of claim 13, wherein evaluating the likelihood of the outcome is a vector of odds ratios with a length equal to a number of unique values for a feature.

15. The computer system of claim 13, wherein the anomalous subset comprises adversarial samples.

16. The computer system of claim 13, wherein the program instruction to identify the anomalous subset utilizing multi-dimensional subset scanning as the search problem, comprise the steps of:

iterating divergent subgroup identification until convergence to a local maximum is found.

17. The computer system of claim 13, wherein the program instructions, stored on the one or more computer readable storage media, further comprise the steps of:

characterizing the identified anomalous subset by quantifying an anomalousness score, an analysis of the anomalous features, a size of the subset, a computed odds ratio, and identification duration.

* * * * *